United States Patent [19]

Shiozawa

[11] Patent Number: 4,943,748
[45] Date of Patent: Jul. 24, 1990

[54] MOTOR WITH CUP-SHAPED ROTOR HAVING CYLINDRICAL PORTIONS OF DIFFERENT DIAMETER

[75] Inventor: Shinichi Shiozawa, Komagane, Japan

[73] Assignee: Yugen Kaisha Chubuseimitsu, Nagano, Japan

[21] Appl. No.: 369,990

[22] Filed: Jun. 22, 1989

[30] Foreign Application Priority Data

Jul. 16, 1988 [JP] Japan .................................. 63-176245

[51] Int. Cl.⁵ ...................... H02K 21/24; G11B 5/012
[52] U.S. Cl. .................................. 310/67 R; 310/268; 360/98.07
[58] Field of Search ..................... 310/67 R, 156, 261, 310/268; 360/98.06, 98.07

[56] References Cited

U.S. PATENT DOCUMENTS

| 4,283,644 | 8/1981 | Kondo et al. | 310/268 |
| 4,554,473 | 11/1985 | Müller | 310/67 R |
| 4,607,182 | 8/1986 | Ballhaus | 310/67 R |
| 4,737,673 | 4/1988 | Wrobel | 310/67 R |

Primary Examiner—Peter S. Wong
Assistant Examiner—D. L. Rebsch
Attorney, Agent, or Firm—Jordan and Hamburg

[57] ABSTRACT

Motor structure having a shaft supported on a frame rotatably by bearings, a core arranged outside of the shaft, a cup-shaped rotor arranged outside of the core, and a magnet fitted to the rotor, the rotor having a rotor body integrally incorporated with the above-mentioned shaft, and the rotor body having an opened end part from which a magnet mounting section is bulged out, whereby the above-mentioned magnet is fitted to the magnet mounting section, facing the shaft.

14 Claims, 1 Drawing Sheet

MOTOR WITH CUP-SHAPED ROTOR HAVING CYLINDRICAL PORTIONS OF DIFFERENT DIAMETER

FIELD OF THE INVENTION AND STATEMENT OF THE RELATED ART

The present invention relates to a motor structure used in a disc drive motor or the like, for a magnetic recording apparatus or an optical recording apparatus.

FIG. 2 shows an example of a disc drive motor which has been already known. In this motor, the base part of a disc mounting section 241 in a cup-shaped rotor 24 made of magnetic material is rotatably fitted through a bearing 23 on the upper part of a shaft 22 which is planted upright on a frame 21 integrally therewith, and further a flange-like disc abutting part 242 is formed on the outer periphery of the lower end of the disc mounting section 241. Further, a drive coil 26 is wound around a core 25 fitted on the shaft 22 within the disc mounting section 241, and a magnet 27 is fitted on the inner peripheral surface of the disc mounting section 241 outside of and adjacent to the coil. Further, in FIG. 2, there are shown a disc 28 mounted on the disc mounting section 241, a sensor 29 and a terminal board 30.

With the motor having the above-mentioned structure, since the rotor 24 is fitted on the shaft 22, indirectly through the bearing 23, that is, it does not make contact with the shaft, static electricity produced in the disc mounting section 241 cannot be discharged, and accordingly, a high voltage is induced between the disc mounting section and the shaft, causing electric erosion in the raceway surface of the bearing 23, resulting in excessive shaft deflection resulting in a problem of generation of noise. Further, since the magnet 27 is fitted directly on the disc mounting section, the rotor should be made of magnetic materials, and accordingly, a difficult cutting process must be used for remedying shaft deflection because a correcting process in which the outer surface of an attaching surface or an abutting part is ground in order to reduce shaft deflection after the assembly of the motor so as to decrease the deflection of the disc mounting section 241 and the abutting part 242 in the motor, is difficult if the rotor made of magnetic materials is used.

Further, if the rotor is made of magnetic materials, rust preventing treatment should be taken. After a correcting process for decreasing the deflection, the rust preventing treatment should be repeated for the thus processed or ground parts, and such a correcting process is therefore cumbersome.

For example, Japanese Laid-Open Patent Nos. 61-112544 and 63-107438 disclose motors solving the above-mentioned problems. These motors have substantially the same structure, and therefore, the motor disclosed in Japanese Laid-Open Patent No. 63-107438 alone will be explained briefly. As shown in FIG. 3, a shaft 32 is rotatably fitted through the intermediary of bearings 33 in the center axial part of a holding cylinder 311 planted upright on a motor frame 31, and the base part of a disc mounting section 341 of a cut-shaped rotor 34 having its lower end opened, is fitted on the upper end part of the shaft which is projected from the holding cylinder, integrally therewith. Further, a drive coil 36 is wound on a core 35 fitted on the outer peripheral part of the holding cylinder 311, and a magnet 37 is fitted in the inner peripheral surface of a disc mounting section 341 through the intermediary of a magnet yoke 41 outside of the core with a gap therebetween. Further, in FIG. 3 there are shown a sensor 39 and a terminal board 40.

In this example of the motor, since the rotor makes contact with the shaft, it is possible to solve the first mentioned disadvantage caused by static electricity inherent to the motor. However, since the bearings are located inside of the core surrounded by the disc mounting section, the diametrical dimensions of the bearings are inevitably small, and accordingly, there is a disadvantage such that detrimental effects are imposed upon the use life, impact resistance and vibration resistance of the bearing. Further, since the magnet is fitted in the inside of the disc mounting section, the diametrical dimension of the magnetic are also inevitably small, and accordingly, there is a further disadvantage such that detrimental effects are imposed upon the characteristics of the motor, such as the motor generation torque characteristic and the like.

OBJECT AND SUMMARY OF THE INVENTION

An object of the present invention is to enable a shaft to be supported by use of a large bearing.

Another object of the present invention is to ensure a long use life, a high wear resistance and a high impact resistance for bearings. Further object of the present invention is to propose a motor structure which can use a magnet having large diametrical dimensions. Moreover, further object of the present invention is to enhance the characteristics of a motor such as the motor generation torque characteristic.

According to the present invention, there is provided a motor structure including a frame, a shaft a bearing rotatably supporting the shaft in the frame, a core arranged outside of the shaft, a rotor having one end opened and arranged outside of the rotor, and a magnet fitted inside of a magnet mounting section formed in the rotor. The rotor body of the above-mentioned rotor is mounted on the above-mentioned shaft in a unit structure, and the above-mentioned magnet mounting section is bulged out from the opened end of the rotor body while the above-mentioned magnet is fitted inside of the magnet mounting section, facing the above-mentioned shaft.

The features of the present invention will become more apparent when the present invention is explained with reference to the drawings which are:

Figure 1:
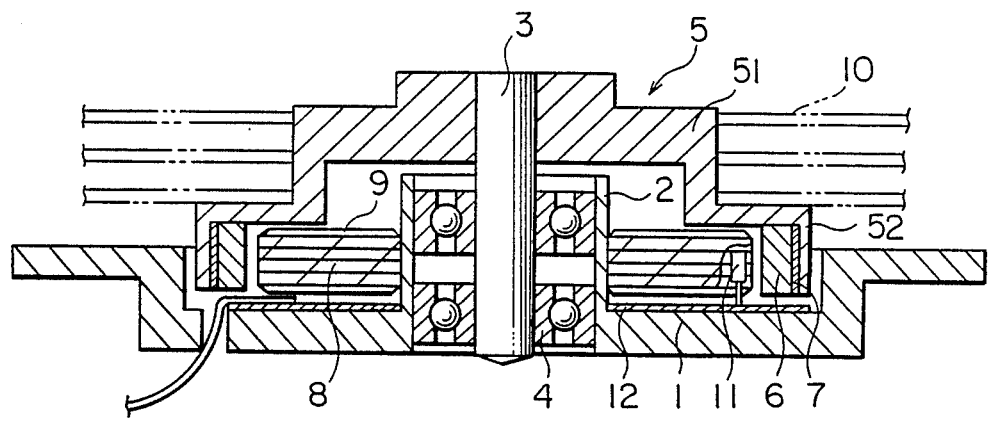
FIG. 1 is a cross-sectional view illustrating one embodiment of the present invention.
Figure 2:
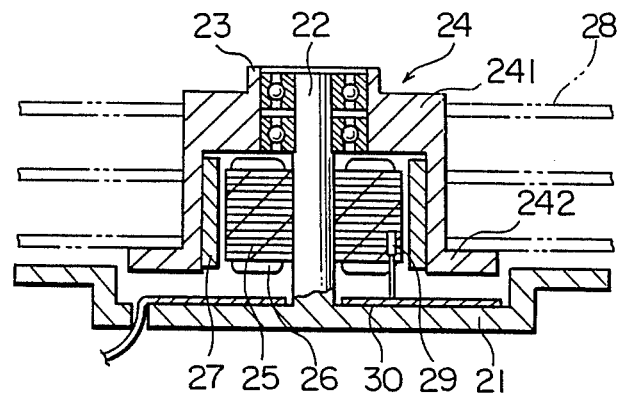
FIGS. 2 and 3 are cross-sectional views illustrating already proposed motors relevant to the present invention, respectively.
Figure 3:
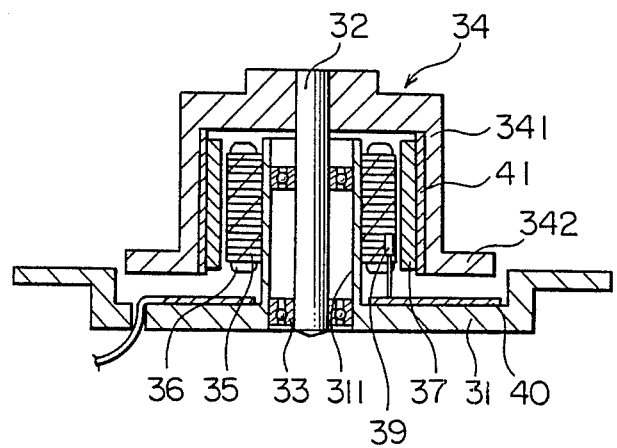

DETAILED DESCRIPTION OF THE PREFERRED EMBODIMENTS:

The present invention will be hereinbelow detailed in an embodiment form which is applied on a drive motor structure in a disc recording apparatus with reference to FIG. 1.

A holding cylinder 2 is planted upright on a motor frame 1, integrally therewith. A shaft 3 is fitted rotatably in bearings 4 in a center axial part inside of the holding cylinder 2, the upper end part of the shaft being projected upward from the holding cylinder 2. The base part of a disc mounting section 51 constituting the body of a cup-shaped rotor 5 is fitted on the upper end part of the shaft 3 integrally therewith. The rotor 5 has an opened part facing downward. The lower end part of the disc mounting section 51 is bulged out so as to form a magnet mounting section 52 having an L-like cross-sectioned shape, and a magnet 6 is fitted in the inner peripheral surface of the magnet mounting section 52 through the intermediary of a magnet yoke 7, facing the shaft 3.

Further, a core 8 is fitted on the outer peripheral part of the above-mentioned holding cylinder 2, and a drive coil 9 is wound on the core 8, facing, at its outside, the above-mentioned magnet 6 with a gap therebetween.

Further, in FIG. 1, there are shown discs 10 mounted on the disc mounting section 51 of the rotor, a sensor 11 and a terminal board 12.

In view of the foregoing arrangement according to the present invention, since the magnet mounting section 52 is bulged out outside of the rotor body 51 while the core 8 and the bearings are disposed in the space surrounded by the magnet mounting section 52, it is possible to use large size bearings, and accordingly, it is possible to ensure a long use life, a high wear-resistance and a high impact resistance for the bearings. Further, since the magnet 6 is mounted in the magnet mounting section 52, facing the shaft 3, a magnet having large diametrical dimensions can be used, and accordingly, it is possible to enhance the motor characteristics such as a motor generation torque characteristic.

In the above-mentioned embodiment, since the magnet 6 is mounted in the magnet mounting section 52 through the intermediary of the magnet yoke 7, there is an advantage such that a material having a suitable machinability can be selected for the rotor. It is natural that the magnet 6 may be fitted directly in the rotor 5 with no attaching member 7 therebetween. However, in this case, the rotor should be made of magnetic materials.

The applicable field of the present invention should be limited to the above-mentioned disc drive motor.

What I claim is:

1. A motor structure comprising a frame wall and a hollow holding cylinder extending generally perpendicular from said frame wall, a rotor shaft coaxially disposed in said hollow holding cylinder, said rotor shaft having an axis of rotation which is vertically disposed, bearing means mounted on said hollow holding cylinder for rotatably supporting said rotor shaft, said holding cylinder having an outer part, coil means mounted on said outer part of said holding cylinder, a cup-shaped rotor means mounted on said rotor shaft, said cup-shaped rotor means having an end wall, a first cylindrical portion extending coaxially from said end wall, an intermediate wall extending radially outwardly from said first cylindrical portion, and a second cylindrical portion extending axially from said intermediate wall such that said first cylindrical portion has a diameter which is less than the diameter of said second cylindrical portion, said coil means being generally axially aligned with and being disposed radially inwardly of said second cylindrical portion, said coil means having an outer diameter greater than the diameter of said first cylindrical portion such that said coil means generally underlies said first cylindrical portion, and magnet means mounted on said second cylindrical portion radially outwardly of said coil means.

2. A motor structure comprising a motor means having a frame wall and a hollow holding cylinder extending generally perpendicular from said frame wall, a rotor shaft coaxially disposed in said hollow holding cylinder, bearing means mounted on said hollow holding cylinder for rotatably supporting said rotor shaft, said holding cylinder having an outer part, coil means mounted on said outer part of said holding cylinder, a terminal board means disposed on said frame wall between said coil means and said frame wall, a cup-shaped rotor means mounted on said rotor shaft, said cup-shaped rotor means having an end wall, a first cylindrical portion extending coaxially from said end wall, an intermediate wall extending radially outwardly from said first cylindrical portion, and a second cylindrical portion extending axially from said intermediate wall such that said first cylindrical portion has a diameter which is less than the diameter of said second cylindrical portion, said coil means being generally axially aligned with and being disposed radially inwardly of said second cylindrical portion, said coil means having an outer diameter greater than the diameter of said first cylindrical portion such that said coil means is generally axially superimposed relative to said first cylindrical portion, and magnet means mounted on said second cylindrical portion radially outwardly of said coil means.

3. A motor structure according to claim 2, wherein said coil means has an outer radial portion disposed between said intermediate wall of said cup-shaped rotor means and said frame wall.

4. A motor structure according to claim 2, wherein said magnet means is disposed between said intermediate wall of said cup-shaped motor means and said frame wall.

5. A motor structure according to claim 2, wherein said end wall of said cup-shaped rotor means has an outer radial end, said first cylindrical portion extending axially from said outer radial end of said end wall, said intermediate wall having an inner radial end and an outer radial end, said first cylindrical portion extending axially from said inner radial end of said intermediate wall, said second cylindrical portion extending axially from said outer radial end of said intermediate wall.

6. A motor structure according to claim 2, wherein said rotor shaft has an axis, said intermediate wall being perpendicular to said rotor shaft axis, said first and second cylindrical portions being coaxial with said rotor shaft axis.

7. A motor structure according to claim 2, wherein said rotor shaft is joined to said end wall of said cup-shaped rotor means.

8. A motor structure according to claim 2, wherein said motor structure is a disc drive motor for driving discs which are mounted on said first cylindrical portion of said cup-shaped rotor means.

9. A motor structure according to claim 2, wherein said rotor shaft has a vertical axis, said first cylindrical portion overlying said coil means.

10. A motor structure according to claim 9, wherein said first cylindrical portion overlies said coil means.

11. A motor structure according to claim 9, wherein said intermediate wall overlies said magnet means.

12. A motor structure according to claim 9, wherein said terminal board means underlies said coil means.

13. A motor structure according to claim 2, wherein said rotor shaft has a vertical axis, said coil means having an outer radial portion, an intermediate radial portion and an inner radial portion, said outer radial portion underlying said intermediate wall, said intermediate radial portion underlying said first cylindrical portion of said rotor means, said inner radial portion underlying said end wall of said rotor means.

14. A motor structure according to claim 2, wherein said first cylindrical portion of said rotor means has an inner and outer cylindrical surfaces, said inner and outer cylindrical surfaces each having a diameter less than the diameter of said coil means.

* * * * *